United States Patent
Ko et al.

(10) Patent No.: US 8,400,950 B2
(45) Date of Patent: *Mar. 19, 2013

(54) METHOD OF TRANSMITTING DATA IN MULTIPLE ANTENNA SYSTEM

(75) Inventors: Hyun Soo Ko, Anyang-si (KR); Bin Chul Ihm, Anyang-si (KR); Wook Bong Lee, Anyang-si (KR); Jae Hoon Chung, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/169,800

(22) Filed: Jun. 27, 2011

(65) Prior Publication Data

US 2011/0255629 A1    Oct. 20, 2011

Related U.S. Application Data

(63) Continuation of application No. 12/146,284, filed on Jun. 25, 2008, now Pat. No. 8,000,258.

(60) Provisional application No. 60/946,130, filed on Jun. 25, 2007, provisional application No. 60/978,140, filed on Oct. 8, 2007, provisional application No. 61/025,304, filed on Feb. 1, 2008.

(30) Foreign Application Priority Data

Aug. 14, 2007   (KR) .................. 10-2007-0081913
Nov. 19, 2007   (KR) .................. 10-2007-0118166
Jun. 13, 2008   (KR) .................. 10-2008-0056001

(51) Int. Cl.
*H04J 1/16* (2006.01)
*H04L 12/56* (2006.01)

(52) U.S. Cl. ......... 370/278; 370/252; 370/230; 370/430

(58) Field of Classification Search .................. 370/252, 370/278, 230, 430
See application file for complete search history.

(56) References Cited

U.S. PATENT DOCUMENTS

| | | | |
|---|---|---|---|
| 6,615,382 B1 | 9/2003 | Kang et al. | |
| 8,000,258 B2 | 8/2011 | Ko et al. | |
| 8,036,131 B2 * | 10/2011 | Roh et al. | 370/241 |
| 2002/0018530 A1 | 2/2002 | Kim et al. | |
| 2003/0148738 A1 | 8/2003 | Das et al. | |
| 2004/0165676 A1 | 8/2004 | Krishnan et al. | |

(Continued)

FOREIGN PATENT DOCUMENTS

| | | |
|---|---|---|
| EP | 1569403 | 8/2005 |
| EP | 1750399 | 2/2007 |

(Continued)

OTHER PUBLICATIONS

Huawei, "Downlink Adaptation/Scheduling Guided by an Efficient CQI-Feedback Scheme," R1-060821, TSG RAN WG1 Meeting 44bis, Mar. 2006, XP-050101734.

(Continued)

*Primary Examiner* — John Pezzlo
(74) *Attorney, Agent, or Firm* — Lee, Hong, Degerman, Kang & Waimey

(57) ABSTRACT

A method of transmitting data in a wireless communication system comprises receiving feedback data on an uplink data channel, the feedback data comprising a precoding matrix indicator (PMI), wherein the value of the PMI corresponds to an index in a codebook, transmitting a precoding scheme for downlink data on a downlink control channel, wherein the precoding scheme is determined as one of at least two of a transmit diversity irrespective of the received PMI, an acknowledgement indicating precoding according to the received PMI and a new PMI indicating that it is used in precoding downlink data to be transmitted, and transmitting the downlink data on a downlink data channel after applying precoding according to the determined precoding scheme.

9 Claims, 10 Drawing Sheets

U.S. PATENT DOCUMENTS

| | | |
|---|---|---|
| 2005/0201474 A1 | 9/2005 | Cho et al. |
| 2006/0146760 A1 | 7/2006 | Khandekar et al. |
| 2006/0176803 A1 | 8/2006 | Oh et al. |
| 2007/0097856 A1 | 5/2007 | Wang et al. |
| 2008/0043677 A1 | 2/2008 | Kim et al. |
| 2008/0176575 A1 | 7/2008 | Sutton |
| 2008/0233902 A1* | 9/2008 | Pan et al. ............... 455/114.3 |
| 2008/0268785 A1 | 10/2008 | McCoy et al. |
| 2008/0268862 A1 | 10/2008 | Kent et al. |
| 2008/0303699 A1* | 12/2008 | Zhang et al. ............... 341/67 |
| 2009/0034636 A1 | 2/2009 | Kotecha et al. |
| 2009/0052405 A1 | 2/2009 | Ko et al. |
| 2009/0307558 A1 | 12/2009 | Lee et al. |
| 2010/0085912 A1 | 4/2010 | Chun et al. |

FOREIGN PATENT DOCUMENTS

| | | |
|---|---|---|
| EP | 1780925 | 5/2007 |
| JP | 2009-004921 | 1/2009 |
| WO | 2006051372 | 5/2006 |
| WO | 2006071052 | 7/2006 |
| WO | 2006130866 | 12/2006 |
| WO | 2007052941 | 5/2007 |
| WO | 2008/137430 | 11/2008 |

OTHER PUBLICATIONS

Huawei, "Baseline Uplink E-CQI Message—Content and Size," R1-063036, TSG RAN WG1 RAN1 Meeting #47, Nov. 2006, XP-050103503.

Huawei, "Overhead Reduction of UL CQI Signalling for E-UTRA DL," R1-061819, 3GPP TSG RAN LTE Ad Hoc, Jun. 2006, XP-050111636.

Huawei, "Downlink adaptation/scheduling guided by an efficient CQI-feedback scheme", R1-060821, TSG RAN WG1 meeting 44bis, Mar. 2006.

Huawei, "Baseline uplink E-CQI message—content and size", R1-063036, TSG RAN WG1 RAN1 meeting #47, Nov. 2006.

LQ Electronics, "CQI overhead reduction for MIMO in frequency domain", R1-071545, 3GPP TSG RAN WG1 #48bis, Mar. 2007.

LG Electronics, "Frequency granularity of CQI and PMI feedback", R1-073491, 3GPP TSG RAN WG1 #50, Aug. 2007.

LG Electronics, "Investigation on tradeoff between PMI overhead and performance", R1-074215, 3GPP TSG RAN WG1 Meeting #50bis, Oct. 2007.

Motorola, "PMI Downlink Signaling and Downlink PDCCH Format", R1-073077, 3GPP TSG RAN1#49bis, Jun. 2007.

Samsung, "Uplink data-non-associated control signaling", R1-071573, 3GPP TSG RAN WG1 Meeting #48bis, Mar. 2007.

Huawei, "Unified uplink CQI signaling by efficient labeling", R1-061246, TSG RAN WG1 meeting 45, May 2006.

Huawei, "Downlink adaptation/scheduling guided by an efficient CQI-feedback scheme", TSG RAN WG1 meeting 44bis, R1-060821, Mar. 2006.

Huawei, "Baseline uplink E-CQI message—content and size", TSG RAN WG1 RAN1 meeting #47, R1-063036, Nov. 2006.

Rohde & Schwarz Products, "UMTS Long Term Evolution (LTE) Technology Introduction", Application Note 1MA111, Mar. 2007.

Ericsson, "Multiple CQI formats", R1-073055, TSG-RAN WG1 #49bis, Jun. 2007.

Samsung, "LTE uplink CQI report format", R1-073107, 3GPP TSG RAN WG1 Meeting #49-bis, Jun. 2007.

Samsung, "CQI report transmission using PUSCH resource", R1-073118, 3GPP TSG RAN WG1 Meeting #49bis, Jun. 2007.

Huawei, "DL control signaling to support MIMO", R1-072905, 3GPP TSG RAN WG1 #49bis, Jun. 2007.

In the USPTO U.S. Appl. No. 12/666,612, Final Office Action dated Oct. 26, 2012, 11 pages.

Huawei, "DL Control Signaling of MIMO PMI Information for SU-MIMO", 3GPP TSG RAN WG1 #49, R1-072318, May 2007.

Texas Instruments, et al., "Proposed Way Forward on Codebook Design for E-UTRA", 3GPP TSG RAN WG1 48, R1-070728, Feb. 2007.

Texas Instruments, "Further Details on Codebook-Based Pre-coding for E-UTRA", 3GPP TSG RAN WG1 47bis, R1-070270, Jan. 2007.

In the Japanese Patent Office Application Serial No. 2010-512093, Office Action dated Nov. 6, 2012, 3 pages.

* cited by examiner

METHOD OF TRANSMITTING DATA IN MULTIPLE ANTENNA SYSTEM

CROSS-REFERENCE TO RELATED APPLICATIONS

This application is a continuation of application Ser. No. 12/146,284, filed Jun. 25, 2008, now U.S. Pat. No. 8,000,258, which claims the benefit of priority of U.S. Provisional application Ser. No. 60/946,130 filed on Jun. 25, 2007, U.S. Provisional application Ser. No. 60/978,140 filed on Oct. 8, 2007, U.S. Provisional application Ser. No. 61/025,304 filed on Feb. 1, 2008, Korean Patent Application No. 10-2007-0081913 filed on Aug. 14, 2007, Korean Patent Application No. 10-2007-0118166 filed on Nov. 19, 2007 and Korean Patent Application No. 10-2008-0056001 filed on Jun. 13, 2008, all of which are incorporated by reference herein in their entirety.

BACKGROUND

1. Technical Field

The present invention relates to wireless communication, and more specifically, to a method of transmitting data in a multiple antenna system.

2. Related Art

Wireless communication systems are widely used to provide various types of communications. For example, voices and/or data are provided by the wireless communication systems. General wireless communication systems provide multiple users with one or more shared resources. For example, the wireless communication systems may use a variety of multiple access techniques such as code division multiple access (CDMA), time division multiple access (TDMA), and frequency division multiple access (FDMA).

Orthogonal frequency division multiplexing (OFDM) uses a plurality of orthogonal subcarriers. OFDM uses the characteristic of orthogonality between Inverse Fast Fourier Transform (IFFT) and Fast Fourier Transform (FFT). A transmitter transmits data after performing IFFT on the data. A receiver restores original data by performing FFT on a received signal. The transmitter uses IFFT to combine multiple subcarriers, and the receiver uses corresponding FFT to separate the multiple subcarriers. According to OFDM, complexity of the receiver may be lowered in a frequency selective fading environment of wideband channels, and spectral efficiency may be enhanced through selective scheduling or the like in a frequency domain by utilizing different channel characteristics of subcarriers. Orthogonal frequency division multiple access (OFDMA) is a multiple access scheme based on OFDM. According to OFDMA, efficiency of radio resources may be enhanced by assigning different subcarriers to multiple users.

Recently, multiple input multiple output (MIMO) systems are spotlighted in order to maximize performance and communication capacity of wireless communication systems. The MIMO technique is a method that can improve transmission efficiency of transmit and receive data by employing multiple transmit antennas and multiple receive antennas, getting out of using one transmit antenna and one receive antenna used up to the present. The MIMO system is also referred to as a multiple antenna system. The MIMO technique does not depend on a single antenna path in order to receive one whole message, but applies a technique that gathers fragmented data segments received through a plurality of antennas and completes a message. As a result, data rate may be improved within a specific range, or a system range may be increased for a specific data rate.

Hereinafter, downlink means transmission from a base station to a user equipment, and uplink means transmission from the user equipment to the base station.

Generally, the base station schedules radio resources of uplink and downlink in a wireless communication system. User data or control signals are carried on the uplink radio resources and downlink radio resources. A channel carrying user data is referred to as a data channel, and a channel carrying control signals is referred to as a control channel. The control signals include various types of control signals needed for communications between the base station and the user equipment. For example, control signals needed for scheduling radio resources in a multiple antenna system include channel quality indicator (CQI), rank indicator (RI), precoding matrix indicator (PMI), and the like. The user equipment transmits uplink control signals such as CQI, RI, PMI and the like to the base station, and the base station schedules radio resources for uplink and downlink based on the control signals received from a plurality of user equipments. The base station informs the user equipment of RI, PMI, modulation and coding scheme (MCS) of the scheduled radio resources through the downlink control signals.

Errors may occur in uplink control signals transmitted from the user equipment to the base station in the process of transmission. If an error occurs in an uplink control signal, it may cause difficulties to schedule radio resources. However, it is not clearly suggested how to make up for an error when the error occurs in the uplink control signal that is needed by the base station for scheduling radio resources.

Therefore, there is a need for a method of preparing for errors that occur in uplink control signals.

SUMMARY

The present invention provides a method for scheduling and transmitting data, which can cope with errors that may occur in uplink control signals needed for scheduling radio resources.

In an aspect, a method of transmitting data in a wireless communication system comprises receiving feedback data on an uplink data channel, the feedback data comprising a precoding matrix indicator (PMI), wherein the value of the PMI corresponds to an index in a codebook, transmitting a precoding scheme for downlink data on a downlink control channel, wherein the precoding scheme is determined as one of at least two of a transmit diversity irrespective of the received PMI, an acknowledgement indicating precoding according to the received PMI and a new PMI indicating that it is used in precoding downlink data to be transmitted, and transmitting the downlink data on a downlink data channel after applying precoding according to the determined precoding scheme.

In another aspect, a method of processing data in a wireless communication system comprises configuring feedback data comprising at least one PMI, wherein the value of a PMI corresponds to an index in a codebook, reporting the feedback data on an uplink data channel, receiving a precoding scheme for downlink data on a downlink control channel, wherein the precoding scheme is determined as a transmit diversity irrespective of the reported PMI or a precoding matrix which is used to precode the downlink data, and receiving the downlink data on a downlink data channel.

DESCRIPTION OF EXEMPLARY EMBODIMENTS

Figure 1:
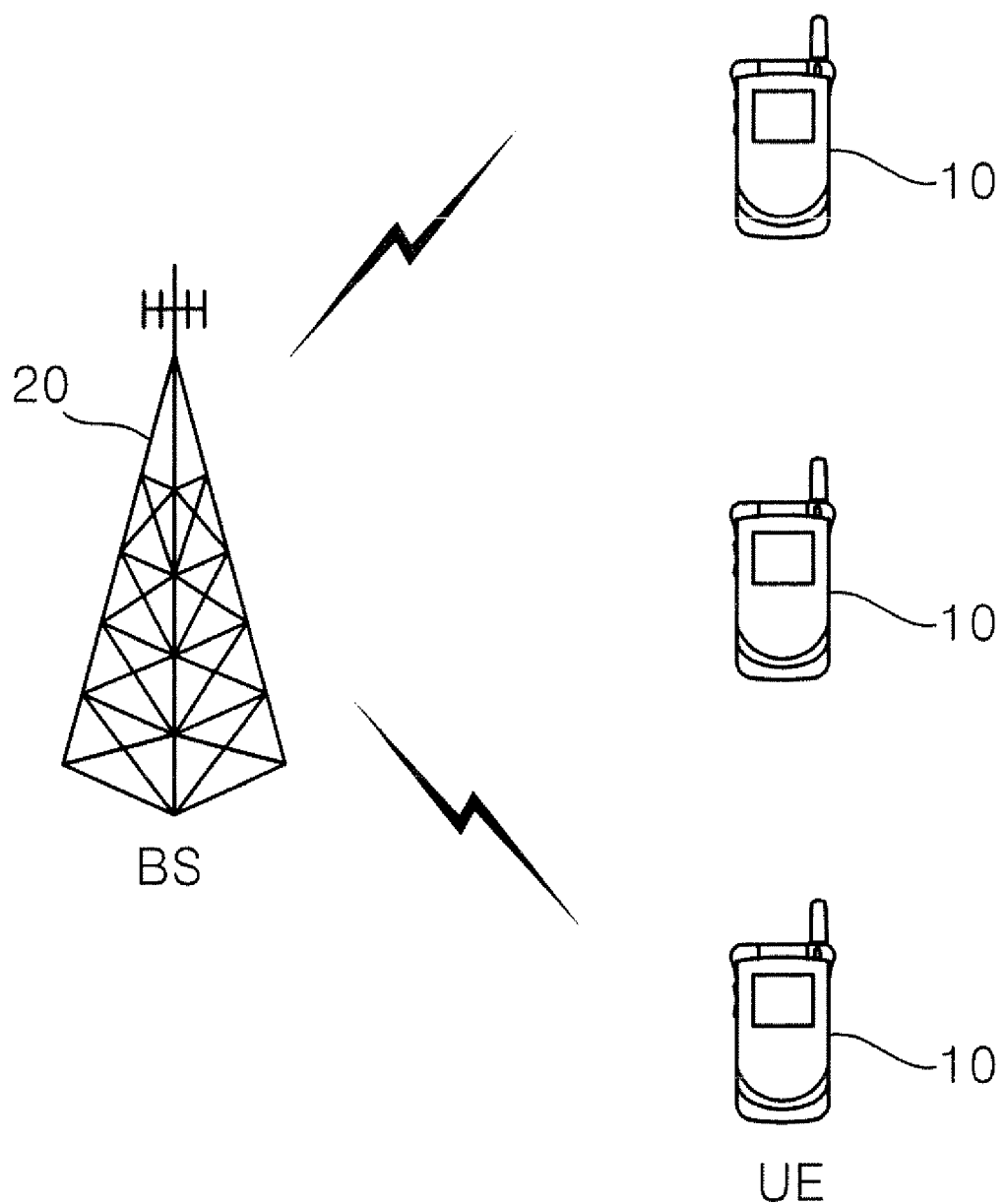
FIG. 1 shows a wireless communication system.

FIG. 1 shows a wireless communication system. Wireless communication systems are widely deployed to provide a variety of communication services such as voices, packet data, and the like.

Referring to FIG. 1, the wireless communication system comprises user equipments (UEs) 10 and a base station (BS) 20. A UE 10 can be fixed or mobile and referred to as another terminology, such as a mobile station (MS), a user terminal (UT), a subscriber station (SS), a wireless device, or the like. Generally, the BS 20 is a fixed station communicating with the UE 10, which can be referred to as another terminology, such as a node-B, base transceiver system (BTS), access point, or the like. There are one or more cells within the coverage of a BS 20.

Any multiple access technique may be applied to the wireless communication system. A variety of multiple access techniques such as code division multiple access (CDMA), time division multiple access (TDMA), frequency division multiple access (FDMA), and orthogonal frequency division multiple access (OFDMA) may be used. For clear explanation, a wireless communication system based on OFDMA will be described hereinafter.

A wireless communication system may be a multiple antenna system. The multiple antenna system may be a multiple input multiple output (MIMO) system. Or, multiple antenna system may be a multiple input single output (MISO) system, a single input single output (SISO) system, or a single input multiple output (SIMO) system. The MIMO system uses a plurality of transmit antennas and a plurality of receive antennas. The MISO system uses a plurality of transmit antennas and a single receive antenna. The SISO system uses a single transmit antenna and a single receive antenna. The SIMO system uses a single transmit antenna and a plurality of receive antennas.

Figure 2:
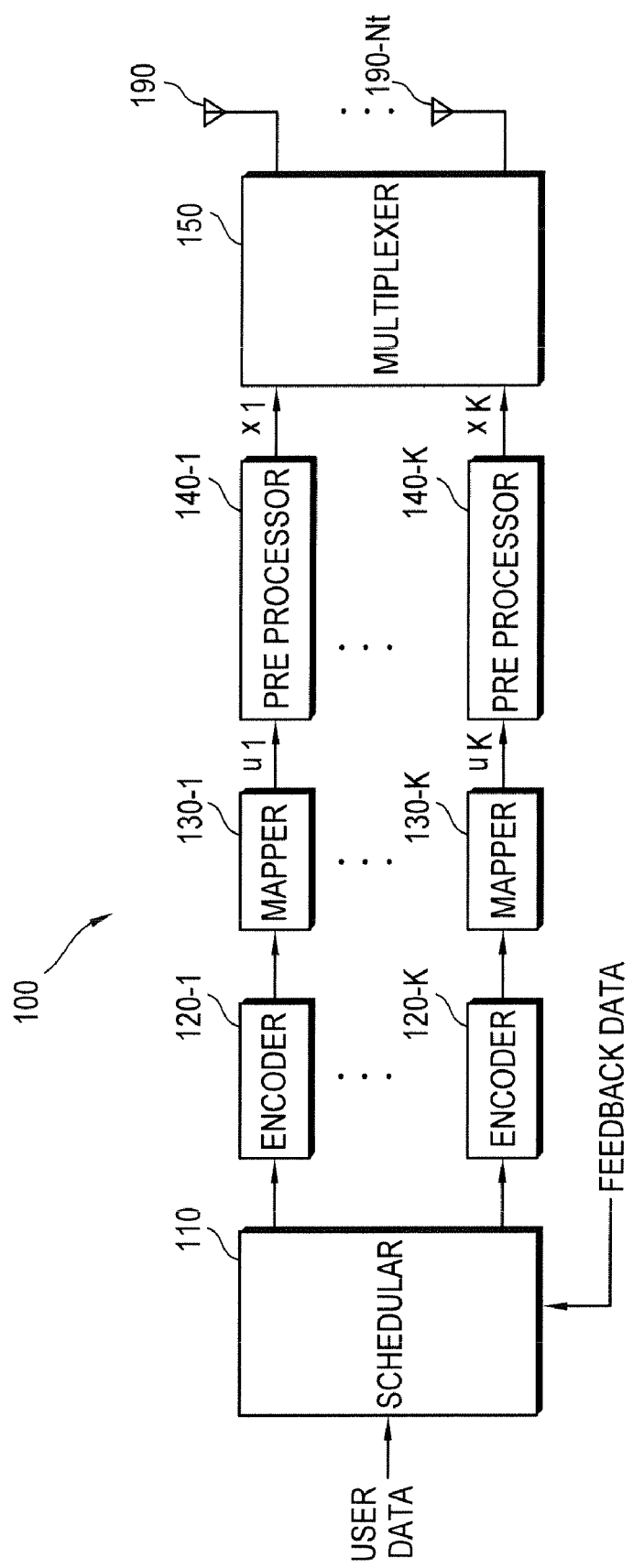
FIG. 2 shows a transmitter having multiple antennas.

FIG. 2 shows a transmitter having multiple antennas.

Referring to FIG. 2, the transmitter 100 comprises a scheduler 110, channel encoders 120-1 to 120-K, mappers 130-1 to 130-K, preprocessors 140-1 to 140-K, and a multiplexer 150. The transmitter 100 also comprises Nt (Nt>1) transmit antennas 190-1 to 190-Nt. The transmitter 100 may be a part of the BS in downlink, and the transmitter 100 may be a part of the UE in uplink.

The scheduler 110 receives data from N users and outputs K streams to be transmitted at a time. The scheduler 110 determines users and data rates to be transmitted through available radio resources using channel information of each user. The scheduler 110 extracts the channel information from feedback data and selects a code rate, MCS, and the like.

The channel information may include channel state information (CSI), a channel quality indicator (CQI), user priority information, and the like. The CSI includes a channel matrix, a channel correlation matrix, a quantized channel matrix, a quantized channel correlation matrix, and the like between a transmitter and a receiver. The CQI includes signal to noise ratio (SNR), signal to interference and noise ratio (SINR), and the like. The user priority information is information on a priority of a user according to a user level and the like.

Available radio resources allocated by the scheduler are radio resources used for transmitting data in a wireless communication system. For example, time slots are resources in a TDMA system, codes and time slots are resources in a CDMA system, and subcarriers and time slots are resources in an OFDMA system. In order to avoid interference with other users within the same cell or sector, each resource may orthogonally defined in a time, code, or frequency domain.

Each of the channel encoders 120-1 to 120-K encodes an input stream in a predetermined coding scheme and forms coded data. Each of the mappers 130-1 to 130-K maps the coded data to a symbol representing a location on a signal constellation. The symbol is referred to as information symbol. Any kind of modulation scheme can be used, including m-phase shift keying (m-PSK) and m-quadrature amplitude modulation (m-QAM). For example, the m-PSK may be BPSK, QPSK, or 8-PSK. The m-QAM may be 16-QAM, 64-QAM, or 256-QAM.

The preprocessors 140-1 to 140-K perform precoding on inputted information symbols $u_1, \ldots, u_k$ and generate input symbols $x_1, \ldots, x_k$. The precoding is a technique for performing preprocessing on the information symbols to be transmitted, and the precoding technique includes random beamforming (RBF), zero forcing beamforming (ZFBF), and the like for creating input symbols by applying a weight vector, a precoding matrix, or the like to the information symbols.

The multiplexer 150 assigns the input symbols $x_1, \ldots, x_k$ to appropriate subcarriers and multiplexes the symbols according to a user. The multiplexed symbols are modulated and transmitted through the transmit antennas 190-1 to 190-Nt.

Figure 3:
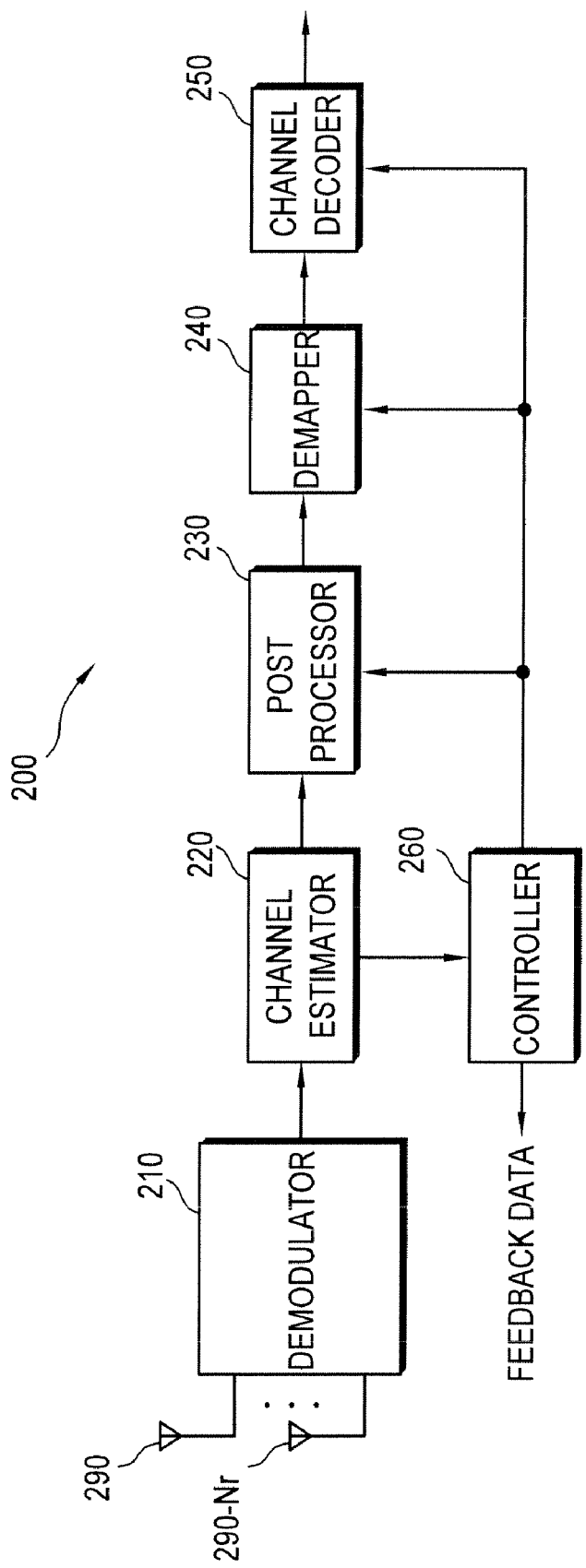
FIG. 3 shows a receiver having multiple antennas.

FIG. 3 is a block diagram showing a receiver having multiple antennas.

Referring to FIG. 3, a receiver 200 comprises a demodulator 210, a channel estimator 220, a post-processor 230, a demapper 240, a channel decoder 250, and a controller 260. The receiver 200 also comprises Nr (Nr>1) transmit antennas 290-1 to 290-Nr. The receiver 200 may be a part of the UE in downlink, and the receiver 200 may be a part of the BS in uplink.

Signals received through the receive antennas 290-1 to 290-Nr are demodulated by the demodulator 210. The channel estimator 220 estimates a channel, and the post-processor 230 performs post-processing corresponding to the preprocessors 140-1 to 140-K. The demapper performs demaping input symbols to coded data, and the channel decoder 250 decodes the coded data and restores original data. The controller 260 feeds back feedback data including CSI, CQI, user priority information, and the like to the transmitter.

Hereinafter, granularities applied to control signals for radio resource allocation in a wireless communication system will be described.

Figure 4:
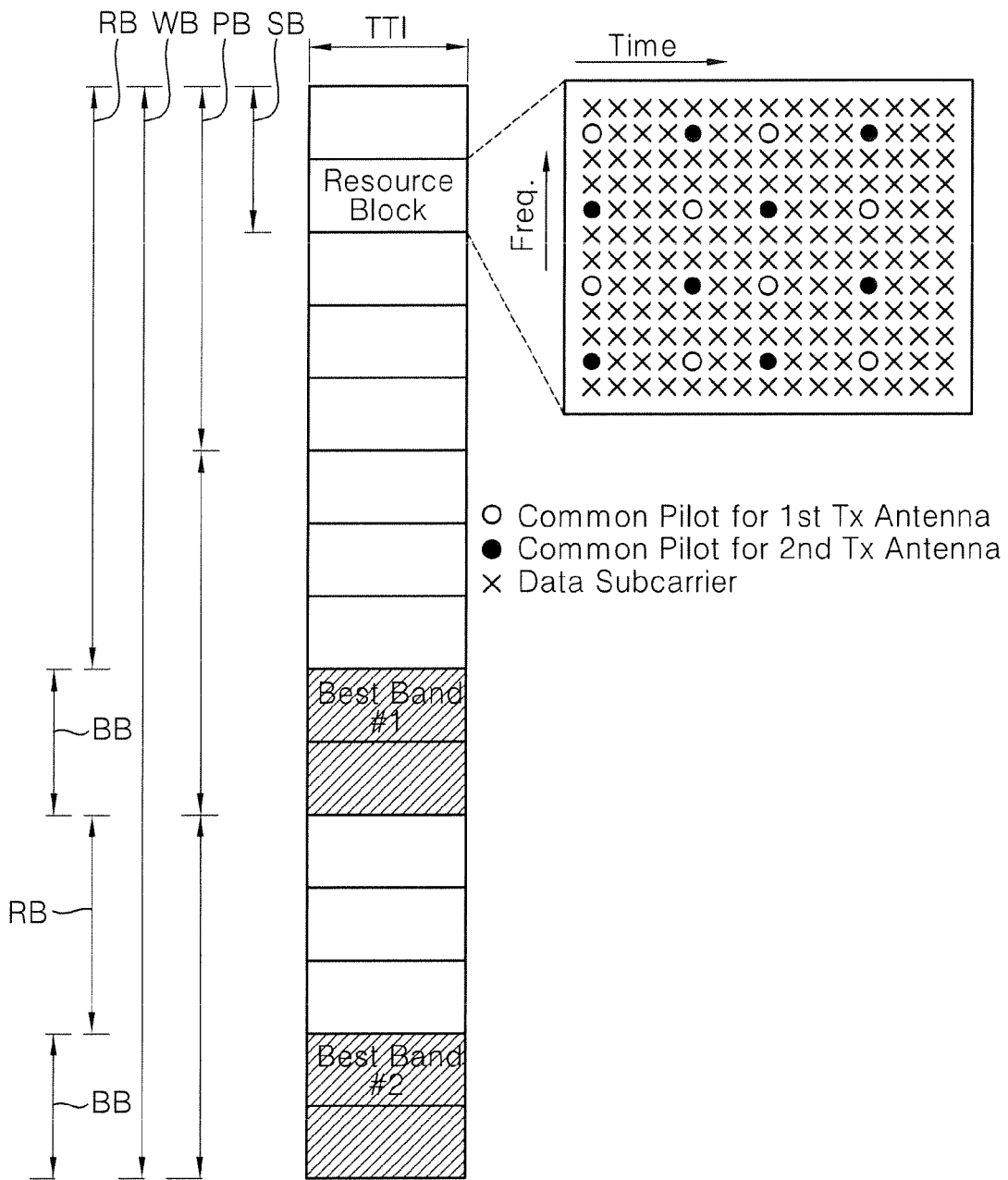
FIG. 4 is an exemplary view showing granularities of control signals for radio resource allocation according to an embodiment of the present invention.

FIG. 4 is an exemplary view showing granularities of control signals for radio resource allocation according to an embodiment of the present invention.

Referring to FIG. 4, user data and control signals are transmitted in a frame comprising a plurality of resource blocks. The frame may include a plurality of OFDMA symbols in the time domain and a plurality of resource blocks in the frequency domain. A resource block is a basic unit of radio resource allocation and includes a plurality of contiguous subcarriers. A subcarrier may be a data subcarrier on which user data or control signals are carried or a pilot subcarrier on which pilot signals are carried. Pilot signals for each antenna may be carried on the pilot subcarriers in the multiple antenna system. Data subcarriers and pilot subcarriers may be arranged in a variety of configurations within the resource block. A transmission time interval (TTI) is a time interval needed to transmit a frame.

A frame may be divided into a variety of granularities such as a wholeband (WB), PMI band (PB), subband (SB), and the like. The SB is a frequency band on which at least one user data or control signal may be loaded. The SB may include one or more resource blocks. The PB includes one or more adjacent subbands. The PB may have a size that is an integer times larger than the subband. The WB represents all SBs corresponding to system bandwidth. Comparing the sizes of these bands, it may be that SB≦PB≦WB.

A frame may be divided into best bands (BB) and residual bands (RB) in the frequency domain according to a transmission scheme of a control signal. The BB indicates at least one subbands selected from the wholeband. The RB indicates remained subbands after excluding the best bands from wholeband. For example, if it is assumed that CQI is transmitted in a Best-M method (M=2), the CQI is calculated for each subband, and two subbands having the largest CQI values among CQIs on respective subbands are selected. The selected two subbands are best bands, and the other subbands are residual bands. CQIs on the two best bands are transmitted as they are. An average of CQIs on all subbands belonging to the residual bands is calculated, and the average value may be transmitted as a CQI on the residual bands. Or, CQIs on the two best bands are averaged and transmitted as an average CQI on the best bands, and also CQIs on the residual bands may be averaged and transmitted as an average CQI on the residual bands. Or, when a CQI on each of the best bands or an average CQI is transmitted as the CQI on the best bands, an average CQI on the wholeband may be transmitted.

The whole frequency band is divided into a variety of granularities in order to reduce overhead caused by control signaling and efficiently transmit the control signals. For example, it is effective to obtain and transmit a CQI for each subband to provide a service of further superior Quality of Service (QoS) to a plurality of UEs. However, if CQIs on all subbands are transmitted, the overhead increase. Therefore, several subbands having a high CQI value are selected as best bands, and the CQIs of the best bands are transmitted. Only an average value is transmitted as the CQI on the residual bands.

A precoding matrix indicator (PMI) is control information needed for preprocessing and post-processing user data. Since the PMI affects QoS of a wireless communication system less than the CQI does, it is effective to obtain and transmit a PMI on each PMI band having a granularity larger than the subband. The size of the PMI band may be equal to or larger than the subband. A PMI may be obtained on each subband, and a PMI on the best bands may be transmitted. In addition, one PMI may be obtained and transmitted on the wholeband. A PMI on a specific band selected from the wholeband is referred to as a frequency selective PMI. A PMI on the wholeband is referred to as a frequency flat PMI. The frequency flat PMI may be transmitted on a control channel or a data channel. The frequency selective PMI may be transmitted on a data channel. An example of the data channel is a physical uplink shared channel (PUSCH), and the control channel is a physical control channel (PUCCH). It is since that the frequency selective PMI is variously determined depending on the number of selected specific bands. In some cases, the frequency selective PMI and the frequency flat PMI may be transmitted together, it is called multiple PMIs. Accordingly, it is difficult to transmit all of the multiple PMIs on a control channel.

A rank indicator (RI) represents an independent channel that can be multiplexed by multiple antennas, and it is sufficient to obtain and transmit an RI by the unit of the wholeband WB.

The configuration of the frame and the bands of a variety of granularities included in the frame as described above are merely an example, and the size and number of respective bands may be variously modified and applied.

Figure 5:
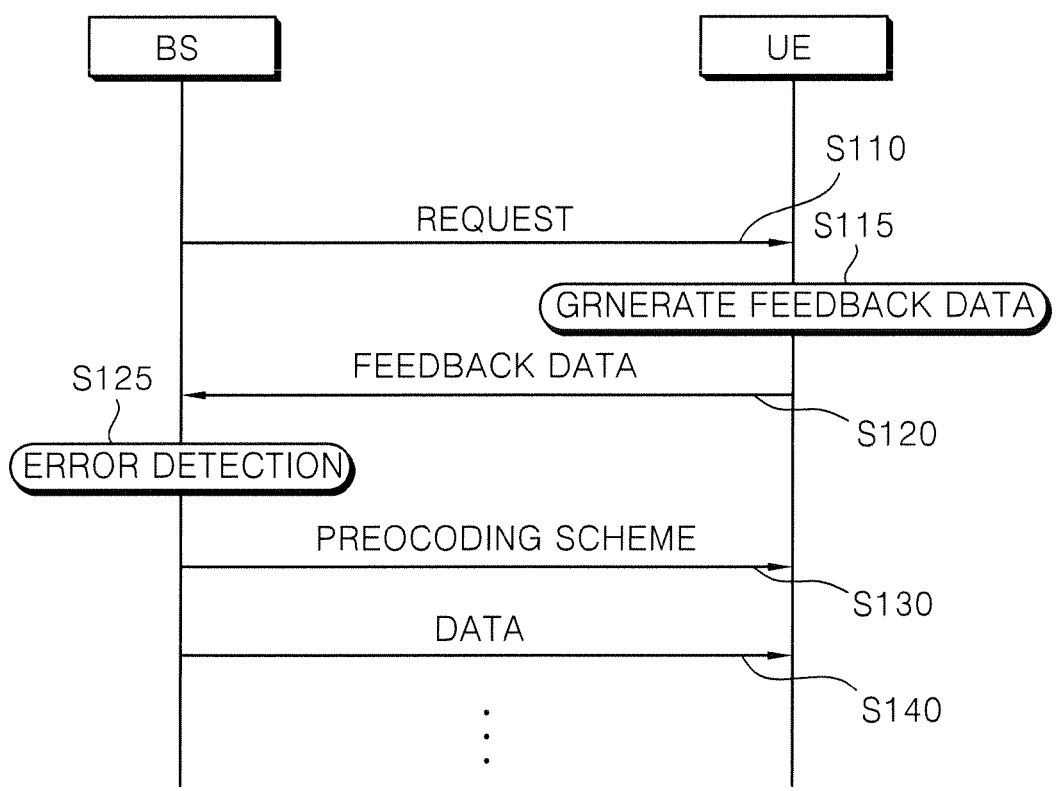
FIG. 5 is a flowchart illustrating a method of transmitting data according to an embodiment of the present invention.

FIG. 5 is a flowchart illustrating a method of transmitting data according to an embodiment of the present invention.

Referring to FIG. 5, in step S110, a BS transmits a request message for requesting feedback data to a UE. The request message may be transmitted on a downlink control channel which can be called as a physical downlink control channel (PDCCH). The request message may include uplink scheduling information which includes an uplink radio resource assignment to be used to transmit the feedback data and an indicator to indicate transmission of the feedback data.

In step S115, the UE generates the feedback data. The feedback data may include at least one CQI, at least one PMI and one RI. The feedback data may be generated in various form according to a report type. The report type indicates which forms of CQI, PMI and rank is included in the feedback data. The report type may be given by a radio resource control (RRC) message.

Table 1 shows an example of report types for the feedback data.

TABLE 1

| Report type | Bitmap | RI | Best-M CQI | Average CQI | PMI |
|---|---|---|---|---|---|
| A | comprised | WB | SB | SB | PB |
| B | comprised | WB | SB | WB | PB |
| C | comprised | WB | SB | OL | PB |
| D | comprised | WB | WB | WB | PB |
| E | comprised | WB | WB | OL | PB |
| F | comprised | WB | OL | OL | — |

'Bitmap' indicates which subbands are selected among a plurality of subbands. That is, selected subbands or PMI bands may be indicated using the bitmap. For example, when 6 subbands are expressed by a bitmap of 6 bits and the first and third subbands are selected, the bitmap may be represented as '101000'. Or, a plurality of control signals may be distinguished using the bitmap. For example, a control signal having a sequence of one RI, two CQIs of best bands, one average CQI of residual bands, and three PMIs of PMI bands is expressed by a bitmap of 7 bits. If a bitmap is given like '0111000', it means that the control signal comprises two CQIs of best bands and one CQI of residual bands. Or, when N best CQIs of M subbands are transmitted or a CQI of the whole band is transmitted in Best-M, a bitmap of null bits may be transmitted.

'RI' may be calculated over the whole band WB and corresponds to the number of useful transmission layer. A CQI is calculated for each transmission layer.

'Best-M CQI', i.e., a CQI for M best bands, and 'Average CQI' may be comprised in the feedback data as a value for a subband or the whole band according to each report type. The best-M CQI may be referred to as best band CQI. One CQI for each subband may be referred to as frequency selective CQI or subband CQI. One CQI over the whole band may be referred to as frequency flat CQI or whole band CQI.

In report type 'A', 'Best-M CQI' is CQIs of M subbands selected by descending power of CQI values of a plurality of subbands or one CQI of M subbands. 'Average CQI' is an average CQI of residual bands. The CQI for M subbands may have differential CQI value with respect to the average CQI.

In report type 'B', 'Best-M CQI' is CQIs of M subbands selected by descending power of CQI values of a plurality of subbands or a CQI of M subbands. 'Average CQI' is an average value CQI of the whole band WB. The CQI for M subbands may have differential CQI value with respect to the average CQI.

In report type 'C', 'Best-M CQI' is CQIs of M subbands selected by descending power of CQI values of a plurality of subbands or a CQI of M subbands. 'Average CQI' is applied to an open loop (OL), which means that a CQI for residual bands is not transmitted. The open loop means transmitting data without considering feedback data.

In report type 'D', 'Best-M CQI' and 'Average CQI' are respectively an average CQI for the whole band. In report type 'E', 'Best-M CQI' is an average CQI for the whole band, and 'Average CQI' is not transmitted or transmitted at further longer periods. In report type 'F', 'Best-M CQI' and 'Average CQI' are not transmitted.

'PMI' is an index of a precoding matrix selected from a codebook. PMI may be selected over a PMI band (PB) and/or the whole band (WB). The PMI band may have a granularity equal to or larger than the subband. Granularity of a PMI band may be variously determined according to the report type of the feedback data. A PMI for at least one subband selected among the wholeband is referred to as a frequency selective PMI, and a PMI on the wholeband is referred to as a frequency flat PMI. A plurality of subbands may be selected and a plurality of frequency selective PMIs may be transmitted on an uplink data channel. The frequency selective PMI corresponds to an index of a codebook of each subband. Multiple PMIs selected from the codebook of each subband is referred to as a frequency selective PMI. One frequency flat PMI may be transmitted on an uplink control channel.

The types of control signals included in the feedback data are merely an example and not a limit. For example, 'PMI' may be given as a value on a subband or the wholeband, and accordingly, the types of control signals included in the feedback data may be diversely modified. The feedback data may be configured in a combination of various types of PMIs and CQIs. For example, the feedback data may be configured with a plurality of PMIs on each of a plurality of subbands and one wholeband CQI on a plurality of subbands. Or, the feedback data may be configured with one PMI on a plurality of subbands, one CQI on the wholeband and one CQI on best bands selected among a plurality of subbands. Or, the feedback data may be configured with one PMI on a plurality of subbands, one PMI on best bands, one CQI on the whole band and one CQI on the best bands.

In step S120, the UE transmits the feedback data to the BS. The feedback data may be transmitted on a physical uplink control channel (PUCCH) or physical uplink shared channel (PUSCH). The PUCCH or PUSCH may be allocated to the uplink radio resource assignment in the request message. When feedback data includes one or two of a CQI, a PMI and a RI, the feedback data may be transmitted on the PUCCH.

On the contrary, when feedback data includes a CQI, a PMI and a RI, the feedback data may be transmitted on the PUSCH due to limited capacity of the PUCCH. The feedback data may be periodically transmitted at transmission intervals of uplink control signals, and the transmission interval is specified by the BS or previously promised between the BS and the UE.

When only CQIs or PMIs and CQIs are transmitted through feedback data, a frequency flat CQI and/or a frequency flat PMI may be transmitted using relatively a small amount of radio resources. When CQIs and/or PMIs are transmitted on a control channel that uses a small amount of radio resources, i.e., on a control channel that is restricted in allocating radio resources, the CQIs and/or PMIs may be transmitted without cyclic redundancy check (CRC).

It may be difficult to transmit frequency selective PMIs on a control channel that is restricted in allocating radio resources. When frequency selective PMIs are transmitted on a control channel, an indicator for a plurality of selected subbands should be assigned. This may be a big overhead on the control channel. For example, in the case of a control channel having radio resources that can transmit a limited message of 10 to 20 bits, there is a limit even in transmitting only CQIs. When CQI, PMI, and RI are transmitted together, it will be a burden inserting an error detection code such as CRC. Accordingly, it is desirable to transmit a frequency flat PMI on a control channel and frequency selective PMIs on a data channel.

In step S120, The BS detects an error in the feedback data received from the UE. When PMI is transmitted on an error detection channel, the BS may confirm whether there is an error in the feedback data. The error detection channel is a channel that can detect whether there is an error in data by attaching CRC to transmission data. The error detection channel is a data channel that can sufficiently use radio resources. If there is an error in the feedback data, the BS determines whether to use the PMI transmitted from the UE. A type of a confirm message to be transmitted later may be changed depending on whether there is an error in a bitmap, PMI, and the like of the feedback data.

Table 2 shows an example of allocating radio resources according to a report type of an uplink control signal. It shows that which PMI will be applied to radio resources that are to be allocated to the UE, assuming that an error occurs in the bitmap or PMI.

TABLE 2

| Allocation type of radio resources | Report type | Feedback data | Best band | Arbitrary Band |
|---|---|---|---|---|
| 1 | A | — | SB | SB |
| 2 | B | No Error | SB | WB |
| 3 | | Bitmap Error | WB | WB |
| 4 | | PMI Error Bitmap and PMI Error | OL | OL |
| 5 | C | — | SB | OL |
| 6 | D | No Error | WB | WB |
| 7 | | Bitmap Error PMI Error Bitmap and PMI | OL | OL |
| 8 | E | — | WB | OL |
| 9 | F | No Error Bitmap Error | OL | OL |

'Arbitrary band' means bands other than best bands selected from the wholeband. That is, the best bands are bands where radio resources are allocated to users, and the arbitrary band means bands other than the best bands. When there is no error in feedback data, the BS allocates radio resources by applying a PMI of the same type as that of the best bands specified by the UE. When there is an error in the bitmap of the feedback data, since the BS does not know subbands specified by the UE, the BS allocates radio resources by applying a PMI on the wholeband WB or applying an open loop (OL) MIMO scheme. Hereinafter, the open loop MIMO scheme is referred to as a secondary MIMO transmit scheme. The BS allocates radio resources by applying a primary MIMO transmit scheme when no error is detected in the feedback data and by applying the secondary MIMO transmit scheme when there is an error in PMI.

Here, the primary MIMO transmit scheme means a transmit scheme that uses information included in the current feedback data, and the secondary MIMO transmit scheme means a transmit scheme that does not use a PMI included in the current feedback data. The primary MIMO transmit scheme is that the BS uses information included in the feedback data. For example, the BS scrambles transmission signals in a spatial, time, or frequency domain using a rank or PMI included in the feedback data and transmits the scrambled signals through multiple antennas. The secondary MIMO transmit scheme is that the BS does not use the PMI included in the feedback data where an error is detected. In secondary MIMO transmit scheme, the BS scrambles transmission signals in a spatial, time, or frequency domain in a previously specified MIMO scheme and transmits the scrambled signals through multiple antennas. The secondary MIMO transmit scheme may be used temporarily for a predetermined time period. If no error is detected in the feedback data thereafter, the primary MIMO transmit scheme may be used.

When an error is detected in the feedback data, the previous feedback data may be used. When a current channel state is not abruptly changed from the previous channel state, a MIMO transmit scheme may be determined using information contained in the previously received feedback data. For example, if an error is detected in the feedback data when CQI/PMI is transmitted in report type 'A', 'B', or 'C', the BS may use the latest feedback data that does not have an error among previously received feedback data. The transmission interval of the used latest feedback data may be informed through an indicator.

At rank 1, space-time coding (STC) such as a space frequency block code (SFBC) and space time block code (STBC), cyclic delay diversity (CDD), frequency switched transmit diversity (FSTD), time switched transmit diversity (TSTD), or the like may be used as the secondary MIMO transmit scheme. At rank 2 or higher, spatial multiplexing (SM), generalized cyclic delay diversity (GCDD), selective virtual antenna permutation (S-VAP), or the like may be used as the secondary MIMO transmit scheme. SFBC is a technique that can secure both a diversity gain and a multiple user scheduling gain in a corresponding dimension by efficiently applying selectivity in the spatial and frequency domains. STBC is a technique that applies selectivity in the spatial and time domains. FSTD is a technique that distinguishes signals transmitted through multiple antennas by frequency, and TSTD is a technique that distinguishes signals transmitted through multiple antennas by time. The spatial multiplexing is a technique for enhancing a data rate by transmitting different data through each of antennas. GCDD is a technique for applying selectivity in the time and frequency domains. S-VAP is a technique that uses a single precoding matrix, which includes multi codeword (MOW) S-VAP for scrambling multi codewords among antennas in the spatial diversity or spatial multiplexing and single codeword (SOW) S-VAP using a single codeword. The secondary MIMO transmit scheme may use only a certain codebook among a plurality of codebooks.

Section 8.4.8 of Institute of Electrical and Electronics Engineers (IEEE) standard 802.16-2004, "Air Interface for Fixed Broadband Wireless Access Systems", may be referenced as an example of space-time coding (STC). Section 5.3.4.1 of 3GPP TS 36.211 V1.1.0 (2007-05), "Physical Channel and Modulation", may be referenced as an example of CDD. Korean Patent Application No. 10-2007-0069770 (Jul. 11, 2007) applied by the present inventor may be referenced as an example of GCDD.

In step S130, The BS informs the UE of a MIMO scheme. The MIMO scheme is transmitted through a confirm message. The confirm message indicates whether the primary MIMO transmit scheme or the secondary MIMO transmit scheme is used. The MIMO scheme indicates whether the PMI included in the feedback data are used as they are and whether a transmit diversity is used regardless of the PMI included in the feedback data. When the control signals are used as they are transmitted from the UE to the BS, the BS does not need to inform the UE of details of the control signals again, but transmits only an acknowledgement message. Particularly, except the case where an error occurs in the feedback data transmitted by the UE or the BS specifies to use another PMI for the reason of scheduling, the PMI transmitted by the UE is used as is. The UE selects an optimal PMI based on channel information, channel state information (CSI), and the like between the BS and the UE. Generally, since the channel state information has a large amount of data, it is not transmitted to the BS. The CQI transmitted by the UE is calculated and quantized in accordance with the PMI. If the PMI is changed, the CQI should be recalculated and changed. However, if there is no PMI transmitted from the UE, the BS may not recalculate a PMI. And if an arbitrary PMI is used, QoS may be further degraded.

On the other hand, the confirm message may indicate a new PMI. The confirm message may be a message for indicating a PMI that is transmitted lately on a data channel from the UE. Or, the confirm message may indicate a previously specified PMI. The confirm message may be a response message for a frequency selective PMI that is transmitted on an error detection channel.

When the BS determines that there is an error in the feedback data, it can use a previously specified secondary MIMO transmit scheme. The BS may select a secondary MIMO transmit scheme instead of using the PMI transmitted by the UE. The BS may transmit a confirm message including an indicator that indicates the secondary MIMO transmit scheme. For example, when an error is detected in feedback data including all kinds of feedback information such as RI, bitmap, PMI, CQI, and the like, the CQI included in the feedback data is unreliable. If downlink data should be transmitted even in this case, a previously specified secondary MIMO transmit scheme may be used. When control information is transmitted on a control channel in a secondary MIMO transmit scheme, since channel state information reported to transmit control information can be used, unnecessary retransmissions performed due to a CQI mismatch may be reduced.

When there is no previously specified secondary MIMO transmit scheme although it is determined that the feedback data has an error, the BS selects a PMI on the wholeband and informs the UE of the PMI. For example, an error may occur in the feedback data when a frequency selective PMI and a frequency selective CQI on best bands are transmitted on an uplink data channel for transmitting PMIs and CQIs. The BS may specify and use a PMI on the wholeband instead of the feedback data having an error. The BS may enhance reliability of data transmission by informing the UE of the PMI on the wholeband through an indicator.

An ACK (Acknowledgment)/NACK (Non-Acknowledgment) signal of one bit that merely indicates whether an uplink control signal is applied may be used as a confirm message. For example, an ACK for a PMI transmitted from the UE means that the PMI is used, and a NACK means that the PMI transmitted from the UE is not used. When the BS determines not to use the PMI transmitted from the UE, the BS may further inform the UE of information on a PMI that will be applied. Or, the confirm message may be expressed with two bits in order to use a previously transmitted PMI. For example, it may be that the latest transmitted PMI is used if the confirm message is '00', the PMI transmitted from the UE before the second transmission interval is used if the confirm message is '01', and the PMI transmitted from the UE before the third transmission interval is used if the confirm message is '10'. If the confirm message is '11', it may be that the PMI transmitted from the UE is not used. The meanings of the confirm message are merely an example, and those skilled in the art may modify and apply the meanings in an apparent form.

In step S140, the BS transmits downlink data to the UE on a downlink data channel. It is assumed that the BS determines not to use the PMI transmitted by the UE and transmits a confirm message including a NACK signal. When the PMI transmitted from the UE is not used, a secondary MIMO transmit scheme is applied to communications between the BS and the UE. For example, if the rank is 1 and the secondary MIMO transmit scheme is SFBC, the UE, received the confirm message of a NACK signal from the BS, receives data by applying SFBC.

On the other hand, the BS may transmit various types of confirm messages including allocation types of radio resources, which are allocated according to the report type and existence of error in an uplink control signal transmitted by the UE, to the UE.

Table 3 shows an example of a confirm message. Here, the report type of an uplink control signal is assumed to be 'B' shown in Table 1. A confirm message may be configured with a combination of indication bits indicating confirm, RI, PMI, and the like.

TABLE 3

| Confirm message type | Number of bits (Indication bits) | No error is detected | An error is detected | RI |
|---|---|---|---|---|
| a | 1 bits (0~1: Confirm) | Confirm (RI, SB, WB) <1> | OL (secondary MIMO) (reported RI) <1> | |
| b | 3 bits (0~1: Confirm) (00~11: RI indication) | Confirm (RI, SB, WB) <1> | OL (secondary MIMO) <1> | RI error OL RI <4> |
| c | 2 bits (0~1: Confirm) (0~1: PMI indication) | Used PMI (RI, SB + WB) (RI, WB) <2> | OL (secondary MIMO) (reported RI) <1> | Bitmap error |
| d | 4 bits (0~1: Confirm) (00~11: RI indication) (0~1: PMI indication) | Used PMI (RI, SB + WB) (RI, WB) <2> | OL (secondary MIMO) <1> | OL RI RI error Bitmap error <4> |

TABLE 3-continued

| Confirm message type | Number of bits (Indication bits) | No error is detected | An error is detected | RI |
|---|---|---|---|---|
| e | 7 bits (0~1: Confirm) (00~11: RI and WB PMI indication) (0000~1111: PMI indication) | Confirm (RI, SB + WB) <1> | OL (secondary MIMO) <1> WB PMI (reported WB PMI) (overriding) <16> | OL RI and WB PMI <4> |

In confirm message type 'a', the RI, SB, and WB transmitted by the UE are applied as they are when no error is detected, and a secondary MIMO transmit scheme is applied based on the RI transmitted from the UE when an error is detected.

In confirm message type 'b', four cases may be added to inform the UE of an error in the RI or the RI of a secondary MIMO transmit scheme. A confirm message may be three bits in total, comprising one bit for indicating confirm and two bits for indicating the RI.

In confirm message type 'c', since the UE should be informed of whether the PMI is a frequency selective PMI and a frequency flat PMI or only a frequency flat PMI when there is an error in the bitmap, the confirm message may be two bits in total, comprising one bit for indicating confirm and one bit for indicating PMI.

In confirm message type 'd', when there is an RI error in addition to a bitmap error or the BS informs the UE of the RI of the secondary MIMO transmit scheme, the confirm message may be four bits in total, comprising one bit for indicating confirm, two bits for indicating RI and one bit for indicating PMI. In confirm message types 'c' and 'd' having a bitmap error, the latest used PMI is indicated.

In confirm message type 'e', a confirm message may express confirm for using the RI and PMI transmitted by the UE as they are, indication of confirm for indicating application of a secondary MIMO transmit scheme, indication of RI of the secondary MIMO transmit scheme and wholeband PMI, overriding of the wholeband PMI, and the like. A wholeband PMI may be previously determined depending on the rank of the secondary MIMO transmit scheme, and the BS may indicate any one of PMIs previously determined. The BS may directly specify a wholeband PMI and inform of the wholeband PMI using four bits.

The confirm message described above is merely an example, and the number of bits of the confirm message and contents to be informed to the UE may be diversely modified. An indicator for confirm, an indicator for a secondary MIMO transmit scheme, and an indicator for a frequency flat PMI may be respectively configured with bits independent from one another, or configured in the form of a bit field indicating respective states. In addition, the rank information may be expressed using the bits independent from those of the confirm message or those of the indicator indicating a secondary MIMO transmit scheme or a frequency flat PMI. Or, the RI may be expressed in an implicit method.

Table 4 shows another example of a confirm message.

TABLE 4

| Confirm indicator | 1 bit | 0: Confirm<br>1: Secondary MIMO transmit scheme (rank and PMI information bits activation) |
|---|---|---|
| MIMO Rank | 2 bit | 00: Rank 1<br>01: Rank 2 |

TABLE 4-continued

| | | 02: Rank 3 |
| --- | --- | --- |
| | | 03: Rank 4 |
| MIMO Precoding Matrix Indicator | 4 bit | 0000~1111 |

Since the number of supported ranks is determined depending on transmit and receive antennas, the number of bits of MIMO ranks may be changed depending on the number of supported ranks. For example, a system that uses two transmit antennas and two receive antennas (2Tx-2Rx) supports rank 2 in maximum, and a system that uses four transmit antennas and two receive antennas (4Tx-2Rx) supports rank 4 in maximum.

Table 5 shows another example of a confirm message. A codebook according to a rank may be indicated.

TABLE 5

| Confirm indicator | 1 bit | 0: Confirm<br>1: Secondary MIMO transmit scheme (rank and PMI information bits activation) |
| --- | --- | --- |
| MIMO Rank and Precoding Matrix Indicator | 6 bit | 000000~001111: Rank 1 Codebook<br>010000~011111: Rank 2 Codebook<br>100000~101111: Rank 3 Codebook<br>110000~111111: Rank 4 Codebook |

The number of bits of PMI may be changed depending on the number of supported codebooks. For example, six codebooks at rank 1 and three codebooks at rank 2 may be used as codebooks for two transmit antennas. Sixteen codebooks may be used at all the ranks as codebooks used for four transmit antennas. When a wireless communication system that uses four transmit antennas supports up to rank 4, two bits for distinguishing ranks and four bits for distinguishing codebooks at each rank are allocated to indicate a rank and PMI. In the case of a system supporting up to rank 2, a rank and PMI may be indicated using five bits.

Table 6 shows another example of a confirm message. A confirm indicator, a rank, and a PMI may be expressed together.

TABLE 6

| Confirm indicator and MIMO Rank and Precoding Matrix Indicator | 7 bit | 1000000: Confirm<br>1000001: Secondary MIMO transmit scheme<br>0000000~0001111: Rank1 Codebook<br>0010000~0011111: Rank 2 Codebook<br>0100000~0101111: Rank 3 Codebook<br>0110000~0111111: Rank 4 Codebook |
| --- | --- | --- |

A method of processing allocated radio resources is determined according to the type of an uplink control signal related to multiple antennas, which is received from the UE, and existence of error in the uplink control signal. All control signals are not transmitted to the UE, but a confirm message is transmitted for the contents that are applied, and thus overhead caused by transmitting control signals may be reduced. Particularly, although a signal to noise ratio (SNR) may be improved when data is transmitted by applying a frequency selective PMI in downlink, overhead caused by downlink control signals is increased since a plurality of PMIs should be transmitted. A confirm message is transmitted for the frequency selective PMI, and thus downlink overhead is reduced, and throughput of data transmission may be enhanced.

Figure 6:
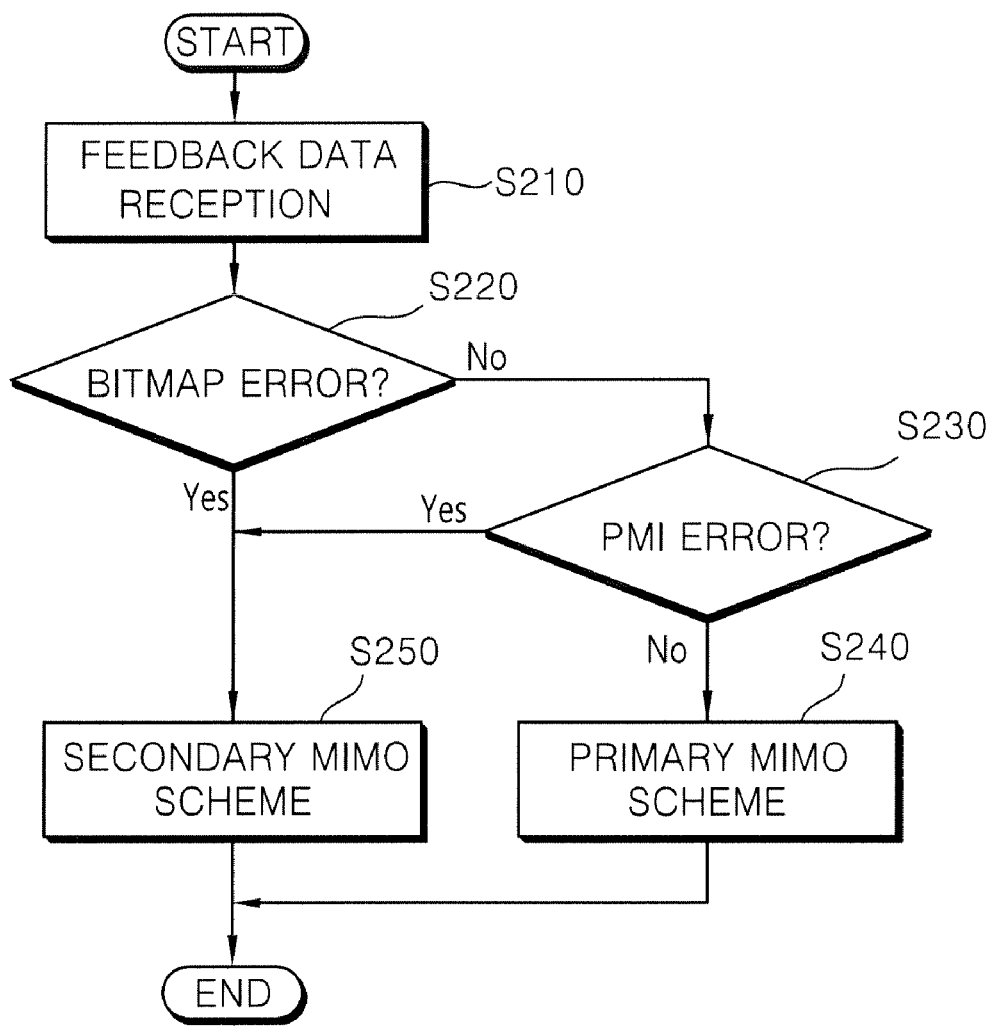
FIG. 6 is a flowchart illustrating a method of determining whether to apply PMI according to an embodiment of the present invention.

FIG. 6 is a flowchart illustrating a method of determining whether to apply PMI according to an embodiment of the present invention. It is assumed that a UE transmits PMIs for respective subbands to a BS.

Referring to FIG. 6, In step S210, the BS receives feedback data from the UE. The feedback data includes a frequency selective PMI that is most appropriate to a channel environment of the UE and a bitmap that specifies subbands having a high CQI value. A frequency flat PMI on the wholeband may be included in the feedback data. The frequency flat PMI may be transmitted on a control channel, and the frequency selective PMI may be transmitted on a data channel.

In step S220, the BS determines whether there is an error in the bitmap of the feedback data transmitted from the UE to the BS.

In step S230, if there is no error in the bitmap, the BS determined whether there is an error in the PMI from the feedback data.

In step S240, if there is no error in the PMI, the BS applies the primary MIMO transmit scheme to allocate radio resources. If there is no error in the PMI and the bitmap received from the UE, the PMI transmitted by the UE is applied to allocate radio resources. Here, the PMI may be a PMI on the wholeband or a subband, and the PMI on the wholeband or a subband may be applied depending on conditions of the bitmap and PMI error.

In step S250, when there is an error in the bitmap or the PMI, the BS applies a secondary MIMO transmit scheme to allocate radio resources. The BS informs the UE through a confirm message that the secondary MIMO transmit scheme is applied and transmits data to the UE using the secondary MIMO transmit scheme.

In this manner, a PMI to be applied to allocation of radio resources may be adaptively selected depending on existence of error in uplink control signals. Accordingly, a PMI value is not transmitted on a downlink control signal, but information on the determined PMI is informed through a confirm message, and thus overhead incurred by downlink control signals may be reduced.

Figure 7:
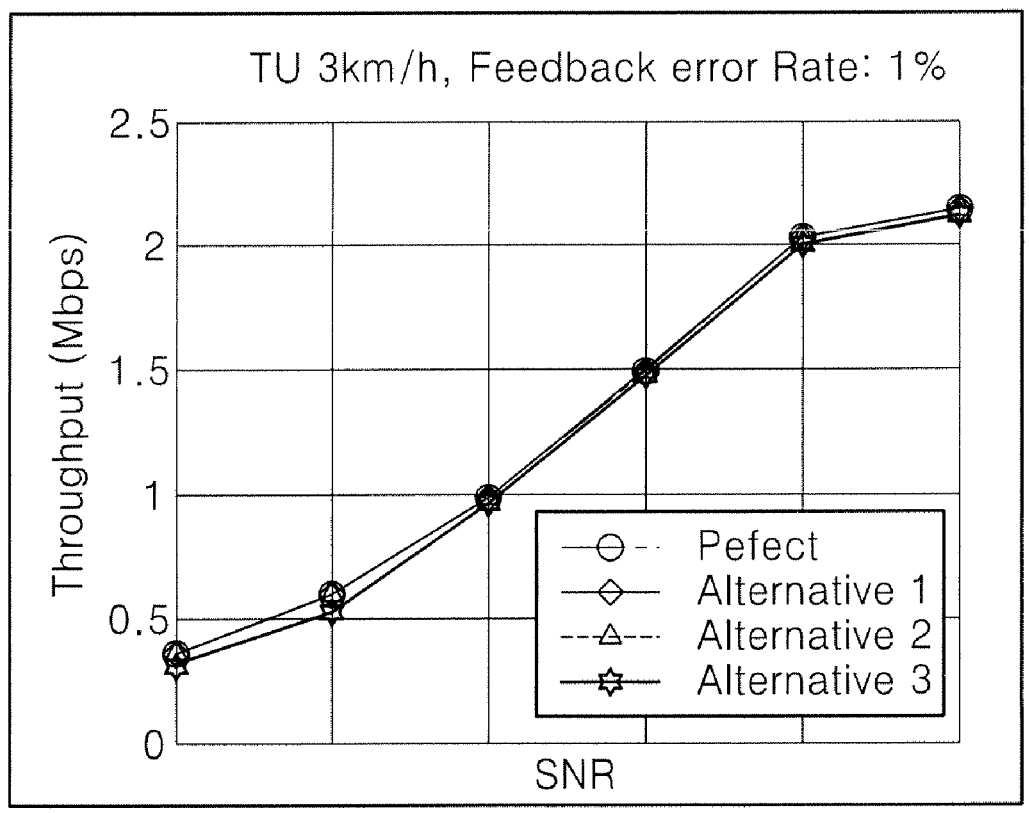
FIG. 7 is an example of a graph showing throughputs with respect to errors in feedback data.
Figure 8:
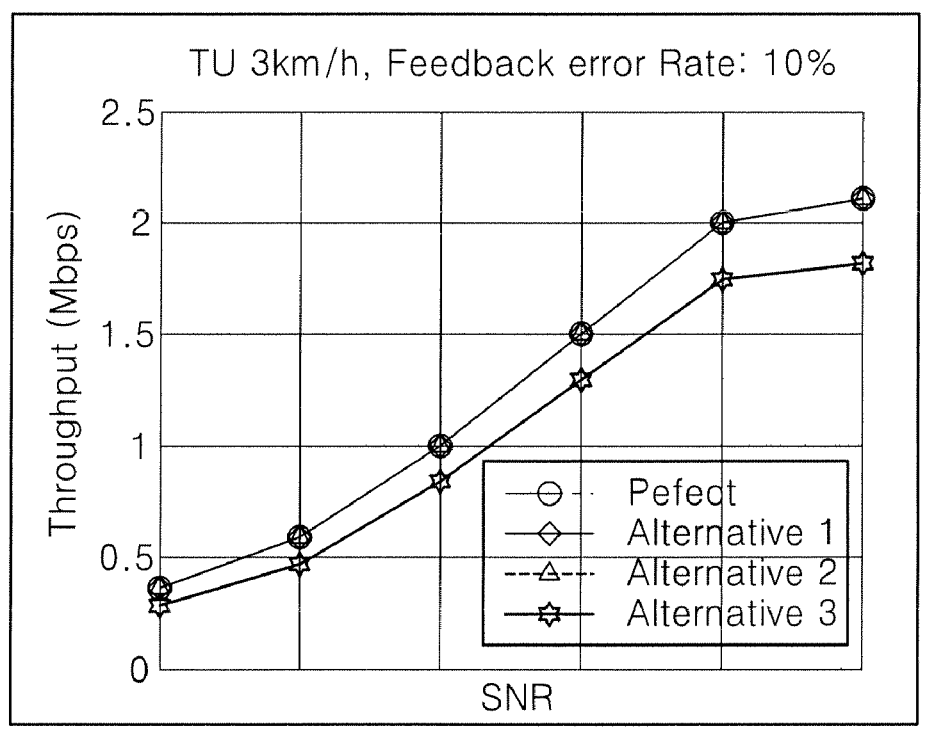
FIG. 8 is another example of a graph showing throughputs with respect to errors in feedback data.
Figure 9:
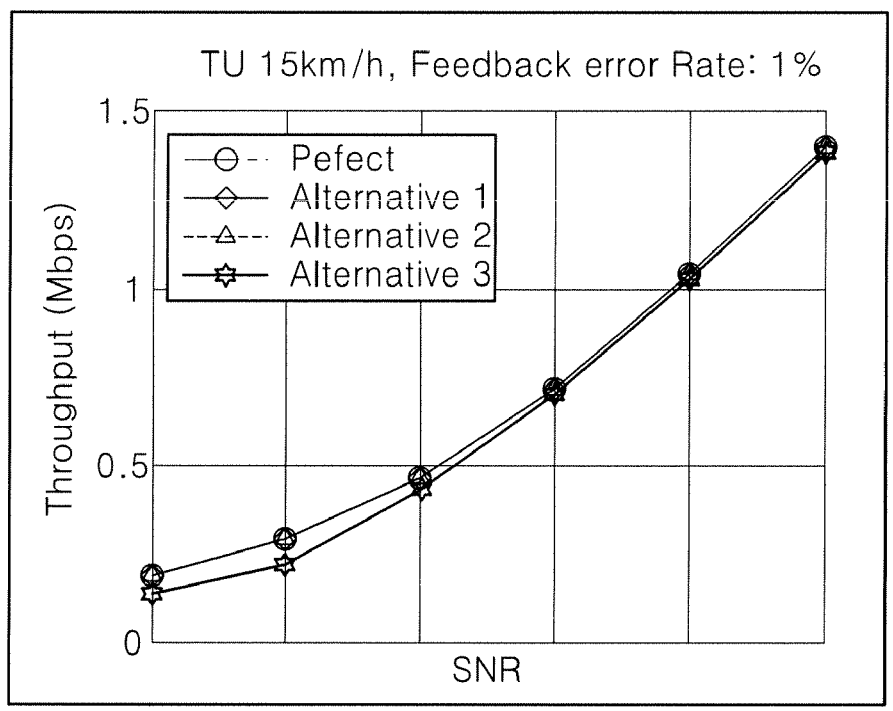
FIG. 9 is still another example of a graph showing throughputs with respect to errors in feedback data.
Figure 10:
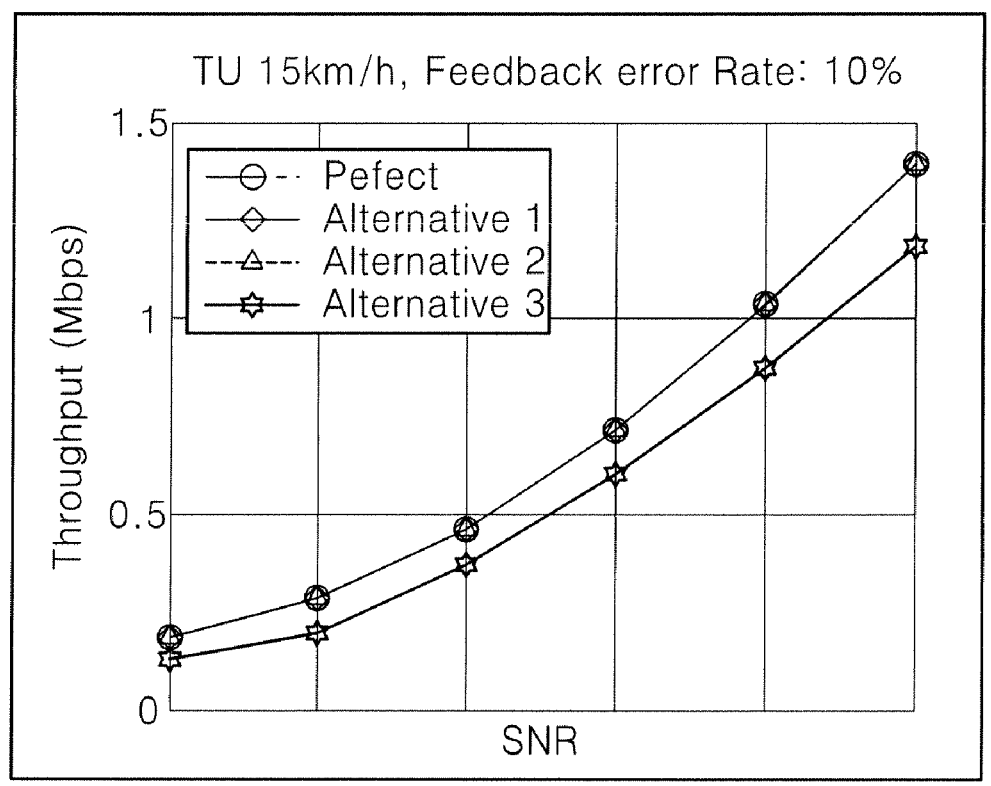
FIG. 10 is still another example of a graph showing throughputs with respect to errors in feedback data.

FIGS. 7 to 10 are examples of graphs showing throughputs with respect to errors in feedback data. FIG. 7 shows a graph when moving speed of the UE is 3 Km/h and the error rate of feedback data is 1%. FIG. 8 shows a graph when moving speed of the UE is 3 Km/h and the error rate of feedback data is 10%. FIG. 9 shows a graph when moving speed of the UE is 15 Km/h and the error rate of feedback data is 1%. FIG. 10 shows a graph when moving speed of the UE is 15 Km/h and the error rate of feedback data is 10%. System throughputs depending on existence of a confirm message are shown.

Referring to FIGS. 7 to 10, the best result is shown when there is no error (perfect) in the feedback data. A confirm message is transmitted in alternatives 1 and 2, and a confirm message is not transmitted in alternative 3. When there is an error in the feedback data, SFBC is applied in alternative 1, and previously transmitted CQIs and PMIs are used or SFBC is applied in alternative 2.

Further better results can be observed when a confirm message is transmitted and a secondary MIMO transmit scheme or previously transmitted CQIs and PMIs are used, compared with a case where a confirm message is not transmitted.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A transmitter for transmitting data in a wireless communication system, the transmitter comprising a processor configured for:
receiving feedback data on an uplink data channel, the feedback data comprising a first precoding matrix indicator (PMI), wherein a value of the first PMI corresponds to an index in a codebook;
transmitting a precoding scheme for downlink data on a downlink control channel, wherein the precoding scheme is determined as either a transmit diversity irrespective of the first PMI, an acknowledgement indicating precoding according to the first PMI or a second PMI indicating that the PMI is used in precoding downlink data for transmission; and
transmitting the downlink data on a downlink data channel by applying precoding according to the determined precoding scheme.

2. The transmitter of claim 1, wherein the processor is further configured for determining the precoding scheme as the transmit diversity when error in the feedback data is detected by using cyclic redundancy check (CRC) attached to the feedback data.

3. The transmitter of claim 1, wherein the first PMI is the latest received PMI through the uplink data channel.

4. The transmitter of claim 1, wherein the transmit diversity includes a space frequency block code (SFBC) and a cyclic delay diversity (CDD).

5. The transmitter of claim 1, wherein the feedback data comprise a plurality of PMIs, each of the plurality of PMIs being selected from the codebook for each sub band.

6. The transmitter of claim 1, wherein the feedback data comprise a frequency flat PMI on a plurality of sub bands and a frequency selective PMI on selected sub bands of the plurality of sub bands.

7. A receiver for processing data in a wireless communication system, the receiver comprising a processor configured for:
configuring feedback data comprising a first precoding matrix indicator (PMI), wherein a value of the first PMI corresponds to an index in a codebook;
transmitting the feedback data on an uplink data channel to a transmitter;
receiving a precoding scheme for downlink data on a downlink control channel from the transmitter, wherein the precoding scheme is determined by the transmitter as a transmit diversity irrespective of the transmitted PMI, an acknowledgement indicating precoding according to the first PMI or a second PMI indicating that the PMI is used to precode the downlink data; and
decoding the downlink data on a downlink data channel by using the precoding scheme.

8. The receiver of claim 7, wherein the feedback data comprise a plurality of PMIs on a plurality of sub bands and one wholeband channel quality indicator (CQI) on the plurality of sub bands.

9. The receiver of claim 7, wherein the first PMI is the latest reported PMI through the uplink data channel.

* * * * *